(12) United States Patent
Wegleitner et al.

(10) Patent No.: US 8,516,438 B2
(45) Date of Patent: Aug. 20, 2013

(54) METHOD AND APPARATUS FOR USER-DEFINED MANAGED OBJECTS

(75) Inventors: Brian Wegleitner, Andover, MN (US); Charles J. Griep, St. Anthony, MN (US)

(73) Assignee: Unisys Corporation, Blue Bell, PA (US)

( * ) Notice: Subject to any disclaimer, the term of this patent is extended or adjusted under 35 U.S.C. 154(b) by 905 days.

(21) Appl. No.: 12/568,963

(22) Filed: Sep. 29, 2009

(65) Prior Publication Data

US 2011/0078619 A1 Mar. 31, 2011

(51) Int. Cl.
*G06F 9/44* (2006.01)
(52) U.S. Cl.
USPC .......................................................... 717/108
(58) Field of Classification Search
USPC .......................................................... 717/108
See application file for complete search history.

(56) References Cited

U.S. PATENT DOCUMENTS

| 5,911,076 | A | * | 6/1999 | Acker et al. | 717/147 |
| 6,061,721 | A | * | 5/2000 | Ismael et al. | 709/223 |
| 2006/0136434 | A1 | * | 6/2006 | Campbell et al. | 707/100 |
| 2008/0282223 | A1 | * | 11/2008 | Neil et al. | 717/106 |
| 2011/0078619 | A1 | * | 3/2011 | Wegleitner et al. | 715/781 |

* cited by examiner

*Primary Examiner* — Philip Wang
(74) *Attorney, Agent, or Firm* — Richard J. Gregson

(57) ABSTRACT

An apparatus creates a user-defined .NET class within an operational control environment of distributed computing systems. The apparatus includes a define module that allows a user to create a new class and define properties for the new class in a specification. After the user creates the new class, the define module creates a .NET class based on the specification. In addition, a method for creating a user-defined .NET class within an operational control environment of distributed computing systems includes receiving a user-defined class; receiving user-defined properties for the user-defined class; and creating a .NET class based on the user-defined class and properties.

11 Claims, 5 Drawing Sheets

METHOD AND APPARATUS FOR USER-DEFINED MANAGED OBJECTS

RELATED APPLICATIONS

The following commonly-assigned patent applications have at least some subject matter in common with the current application, all of which were filed on same date herewith:

Ser. No. 12/568,704 entitled "Method and Apparatus for Reporting an Alert State at Any Level of a Hierarchy of Objects";

Ser. No. "*" entitled "Method and Apparatus for Unrestricted Reporting of Alert States for Managed Objects, Regardless of Type";

Ser. No. 12/568,705 entitled "Method and Apparatus for Displaying Multiple States Within a Single Image"; and Ser. No. 12/568,706 entitled "Method and Apparatus for Displaying a Monitored State with No Explicit Connection".

TECHNICAL FIELD

The present disclosure relates to managing classes in object-oriented programming. In particular, the present disclosure relates to user-defined classes of objects.

BACKGROUND

Information technology systems are essential to any modern business. These systems have grown more and more complex. Today they can include distributed centers located anywhere from a few miles apart to those across the continent or in separate countries. Today, personal computers are common and many businesses employ multiple operating systems from various vendors. Often systems are dispersed in branch offices running critical applications or containing essential data.

Tools are available that integrate operational control of multiple heterogeneous mainframes and distributed systems. These systems include multiple components that need to be managed. Managed classes are used to view, monitor, and manage the components. The managed classes are typically predefined in operational software for managing the components of the system. A limited template for class definition has been provided in the past. This template included a predefined set of properties. In addition, real classes were not created but instead these new classes were simulated by the software and behaved differently than the predefined classes. This behavioral difference is disadvantageous.

For these and other reasons, improvements are desirable.

SUMMARY

In accordance with the following disclosure, the above and other problems are solved by the following:

In a first aspect, an apparatus creates a user-defined .NET class within an operational control environment of distributed computing systems. The apparatus includes a define module that allows a user to create a new class and define properties for the new class in a specification. After the user creates the new class, the define module creates a .NET class based on the specification.

In a second aspect, a method for creating a user-defined .NET class within an operational control environment of distributed computing systems is disclosed. The method includes receiving a user-defined class; receiving user-defined properties for the user-defined class; and creating a .NET class based on the user-defined class and properties.

DETAILED DESCRIPTION

Figure 1:
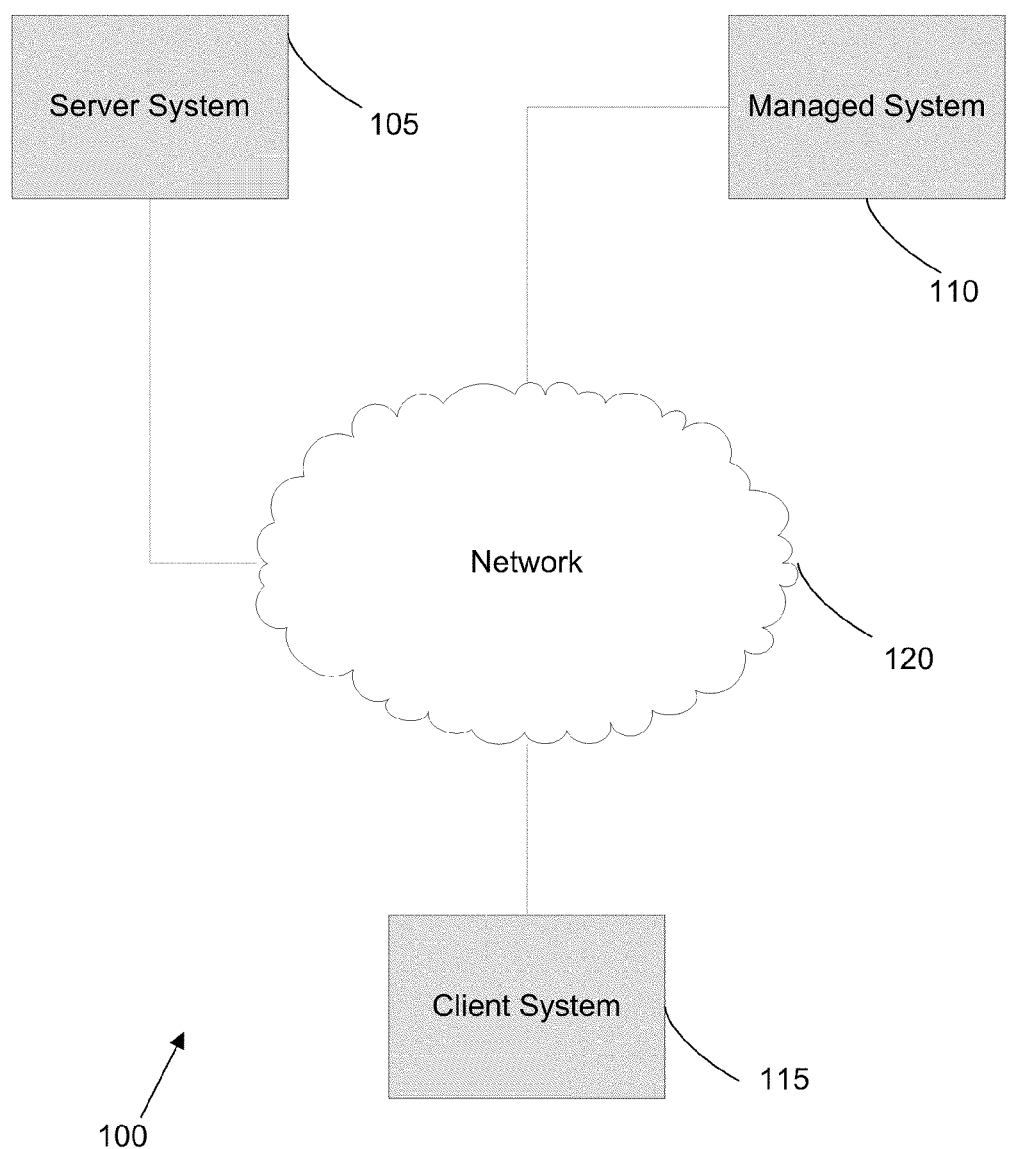
FIG. 1 is a block diagram of an operational system for managing a large computing distributed computing system.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

Object-oriented programming uses primarily classes and objects. A class creates a new type where objects are instances of the class. Objects can store data using ordinary variables that belong to the object. Variables that belong to an object or class are called as fields. Objects can also have functionality by using functions that belong to a class. Such functions are called methods of the class. Collectively, the fields and methods can be referred to as the attributes of that class. Fields can belong to each object of the class or they can belong to the class itself.

Classes are created in the source code itself by using the class statement followed by the name of the class. An object of the class can then be created. Class variables are shared by all objects of that class. There is only one copy of the class variable and when an object makes a change to a class variable, the change is reflected in all other objects as well. Object variables are owned by each object and are not shared. Subclasses can also be used that inherit the properties of the parent class, but can also have additional defined properties.

In general the present disclosure relates to the capability for users to manage systems and components of computing systems such as disks, tapes, users, and processes by managing classes within an operational system. One class may relate to disk drives in the computing system. Many classes are typically predefined in the operational system. The present disclosure relates to the ability to define new classes of objects, allowing the user to specify the characteristics of an object in detail and dynamically extend the feature set of the software well beyond the initial predefined capabilities. The present disclosure removes the limits and creates real ".NET" classes that behave like predefined classes, creating a transparent interface to the user as well as simplifying the implementation of all classes.

Referring to FIG. 1, FIG. 1 is a block diagram of an operational system for managing a large computing distributed computing system 100. The system 100 includes a server system 105, a managed system 110, and a client system 115, as is well known in the art. The server system 105, managed system 110, and the client system 115 preferably communicate with one another over a network 120, which can be any suitable network such as a LAN, WAN, or any other network.

In one possible embodiment, the server system 105 acts as a maintenance processing system and/or a utility monitoring processing system that functions to monitor the activities and health of the components, processes, and tasks executing within the managed system 110. The managed system 110 performs the processing desired by the operators of the managed system 110. Client system 115 are processing systems utilized by operators of the managed system 110 to view operations, maintenance and health information regarding the components, processes and tasks in the managed system 110. In the embodiment shown in FIG. 1, these three systems are shown to be separate processing systems. One of ordinary skill in the art will recognize that these systems may be implemented to operate on one as well as numerous hardware systems without deviating from the spirit and scope of the present invention as recited within the attached claims.

Figure 2:
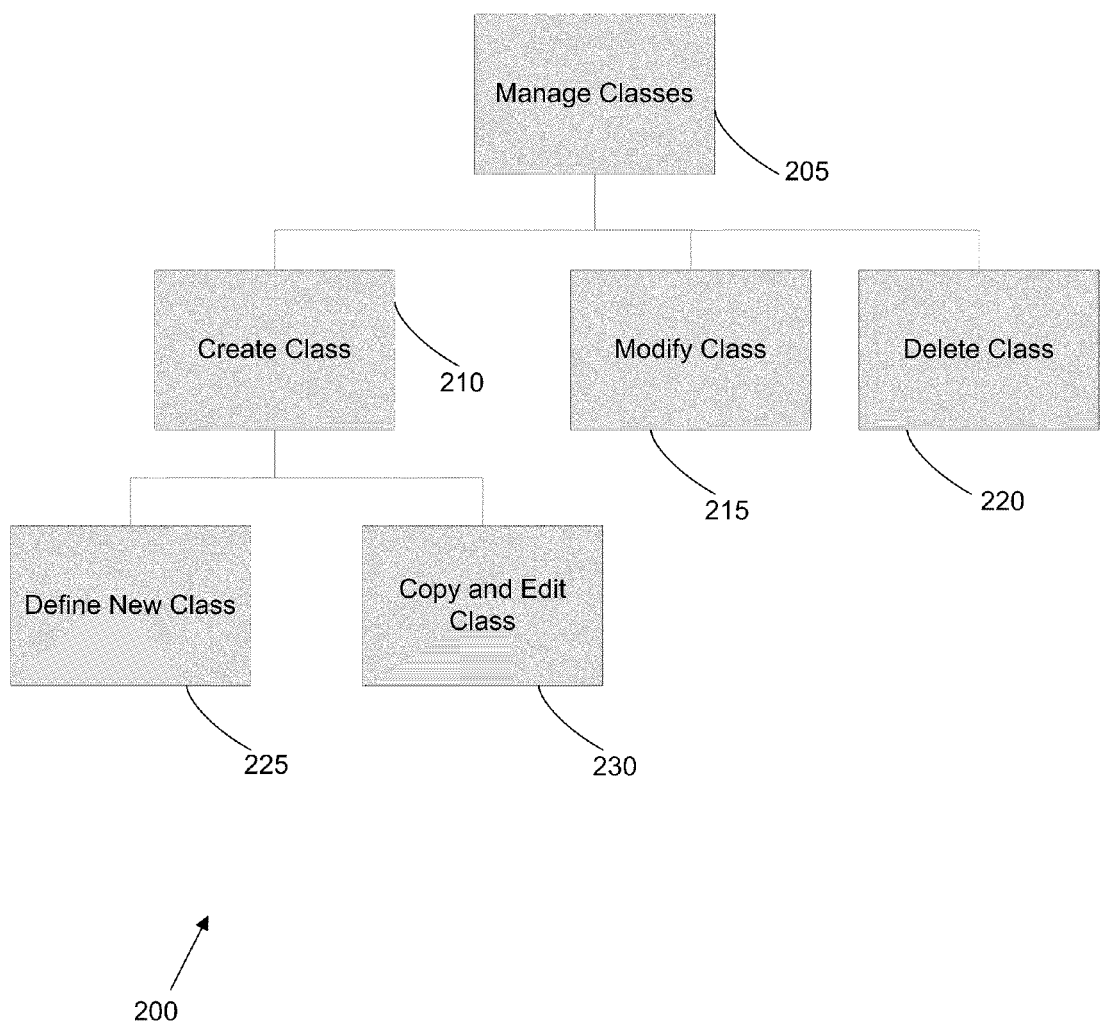
FIG. 2 is a block diagram of a system for managing classes, according to one possible example embodiment of the present disclosure.

Referring to FIG. 2, an operational system for managing classes 200 is illustrated. A manage module 205 allows a user to manage classes within the system. The manage module includes a create module 210, a modify module 215, and a delete module 220. Thus, the user can create classes using the create module 210, modify classes using the modify module 215, and delete classes using the delete module 220. A user may wish to add, modify or delete classes depending on the monitored components of the overall system being monitored. For example, perhaps a new type of server is added to the system. The user may wish to modify the existing class related to servers or may wish to create a new class particular to that type of server. If the user chooses to create a class, a define module 225 allows a user to define a brand new class. A copy module 230 allows a user to copy and edit an existing class. For example, the user could copy an existing class related to a server and edit the copy for the new server type. In another example, a user may wish to delete the old server class out of the operational system because that server was replaced with the new server for which the user defined a new class.

In one example embodiment, Operations Sentinel® by Unisys® provides an operational environment for managing large computing systems. Operations Sentinel® includes predefined classes. These can include an Arbitrary system, MCP system, OS 2200 Console, OS 2200 System, Server, UNIX/Linux System, Windows System and Component. In use, when the manage module 205 is selected, the user is shown a table with a row for each managed class currently defined. When one of these classes is selected, its properties are displayed in a Properties tab in a detail view. These properties can include Object Class, Managed Object Count, Image, Default Action, Base Class, Dynamic Population, Timeout Period, Persists, and Description.

The Base Class property includes the class that the current class extends from. If this is blank, then this class is not derived from any other class. The user selects the base class when defining a new class. The Dynamic Population property indicates that objects of this class can be created dynamically by event reports and deleted dynamically by event reports. The Timeout Period causes the object to be deleted automatically if an event report for an object of this class is not received within a specified amount of time. The Persists property controls whether or not dynamically created objects in this class are retained upon termination of services. The Description property is text describing the managed class. There is also provided a security function through which an administrator can specify permissions that apply to the class as a whole, as well as default permissions for the objects of the class.

In the present disclosure, the user can define a new class by selecting the define module 225. In one example embodiment, this brings up a wizard that allows the user to specify the class name, description, timeout period, and to select the base class, default icon, and default action. The base class that the user selects can be one of the predefined classes or any class derived therefrom. The user can also specify whether the class is dynamic, whether its objects persists, and any user desired properties for the class.

The user can also create a class by selecting the copy module 230. Here the user would copy from another instance. The source class cannot be a predefined class. In copying, all of the properties are copied and can be edited accordingly. The user can delete a class by selecting the delete module 220. However, predefined classes cannot be deleted.

Figure 3:
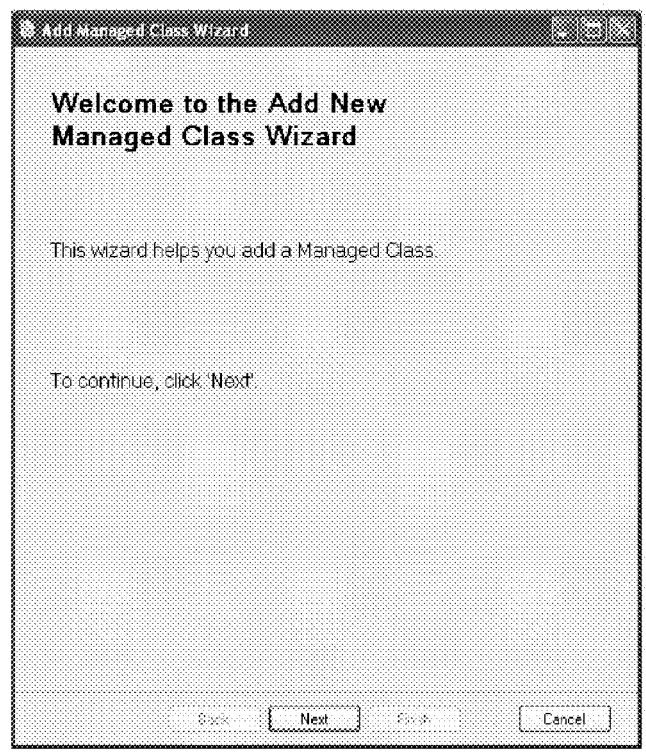
FIG. 3 is a screen shot of a window for creating a new managed class, according to one possible example embodiment of the present disclosure.
Figure 4:
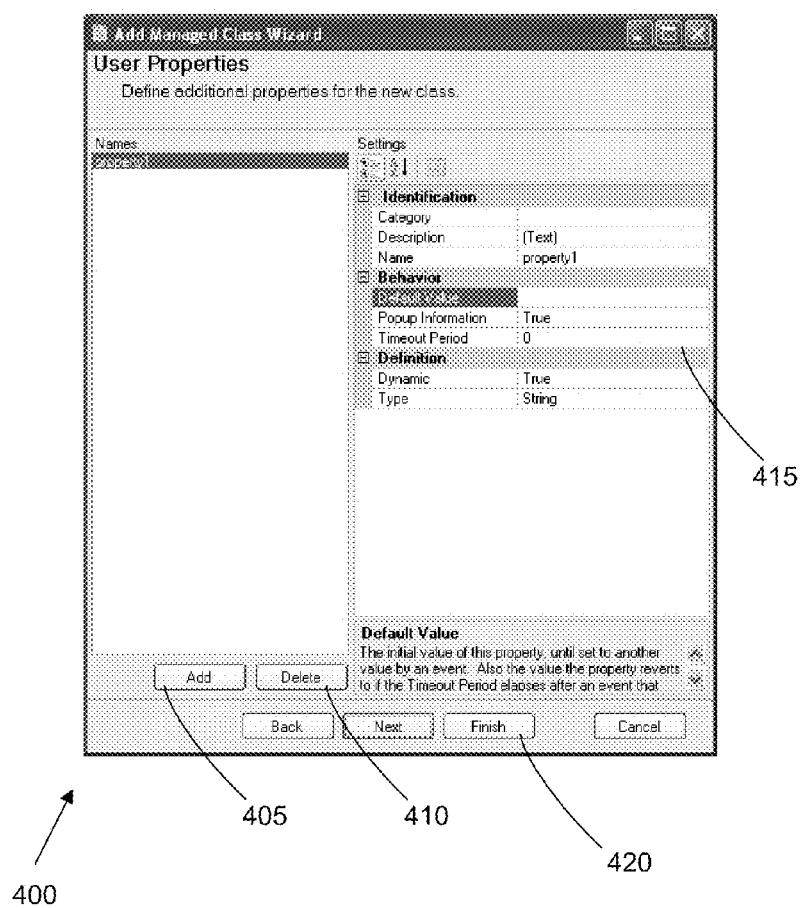
FIG. 4 is a screen shot of a window for defining properties of a managed class, according to one possible example embodiment of the present disclosure.

Referring to FIG. 3, FIG. 3 illustrates a window 300 for creating a new managed class, for example by selecting the create module 210 of FIG. 2. Further windows allow the user to specify the name and derivation of the class, eventually leading to a window that allows the definition of any number of class properties. Referring to FIG. 4, FIG. 4 illustrates a window 400 for allowing a user to define the properties of the class. An "add" button 405 is provided for adding properties as well as a "delete" button 410 for deleting properties. A pane 415 displays the current properties as well as their values. Each user property has several meta-properties including name, type, description, category, dynamic, timeout period. Default value, appears in popup information as shown in pane 415.

The name property is the name of the property as it appears in the display and detail panes. It is also the name that must be used in event reports to set a value for the property in managed object. The name is case sensitive, is limited to 64 characters, and can contain spaces. The type property is the data type of the property. It can be a string, boolean, or an integer. A string property can be of any length, can include characters, newlines, and multi-byte characters. The description property is the text description that appears below the detail pane when the property is selected in operations mode. The category property is the category under which the property appears in operations mode. The dynamic property indicates the value of the property can be altered by an event report. This implies that the value can be altered from operations mode via an external application that sends an event report, provided such an external application has been defined by the site.

The timeout period is a number of seconds for which timeout can occur. The default value is the value to which the property is automatically set when an object is created, unless an event report creating the object sets it to another value. The appears in popup information indicates that the property name and value appear in the text that is displayed when the user moves his mouse over the icon representing the object in a topology that includes the object in operations mode.

Once the user has completed defining the properties for the class, a "finish" button 420 is selected. The underlying source code then uses a .NET TypeBuilder feature to create a real .NET class based on the user specification from the create module 210. This class is displayed in the user interface along with all other predefined and user defined managed classes, allowing the user to modify the class definition and create objects of any class to be monitored, such as a component of the computing system. Once the user-defined class is created, there is no way to distinguish between predefined classes and user-defined classes. All the objects are treated the same as objects of predefined classes, and are xml serialized across the network connection between the client and server. Also, event reports are written the same for objects of user-defined classes as for those of predefined classes.

Figure 5:
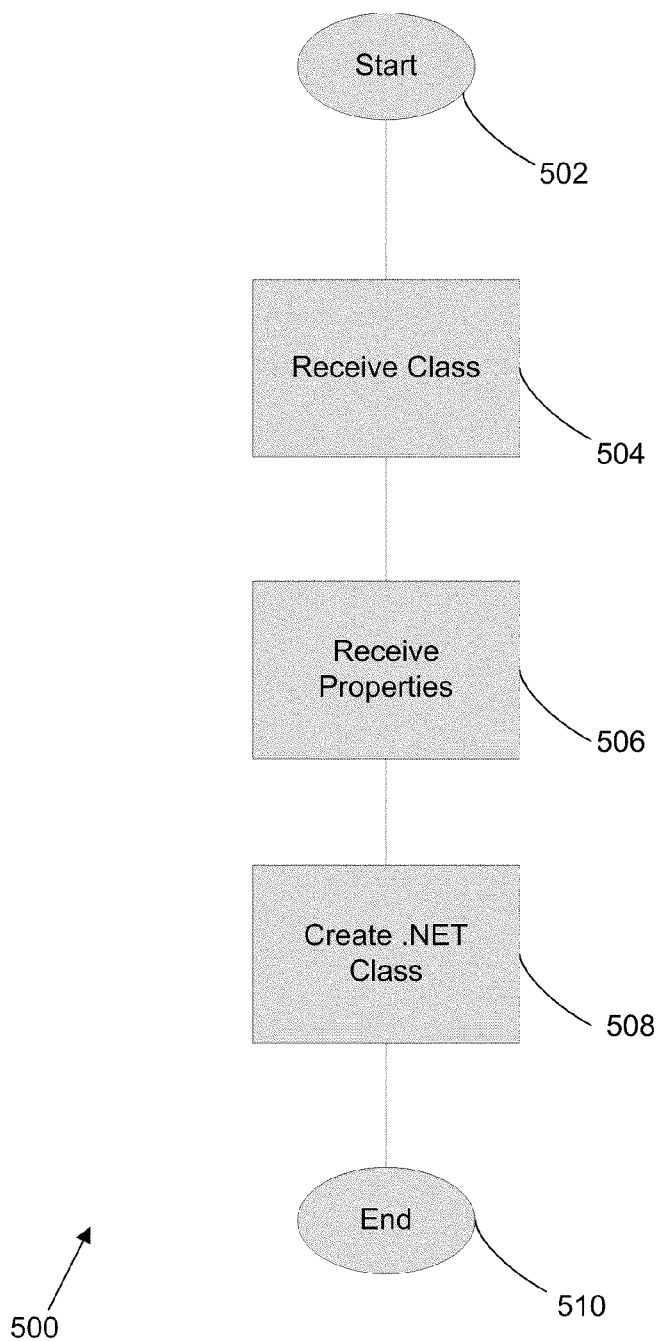
FIG. 5 is an operational flow diagram of a system for creating a new class, according to one possible example embodiment of the present disclosure.

Referring to FIG. 5, FIG. 5 is an operational flow diagram illustrating a method 500 of creating classes. Operational flow begins at a start point 502. A first receive operation 504 receiving a new class definition. A second receive operation 406 receives properties for the new class. A create operation 508 creates a .NET class from the new class definition from the first receive operation 504 and the properties from the second receive operation 506. Operational flow ends at an end point 510.

The above description is advantageous because it provides the user with far greater flexibility in the definition of managed classes because it allows the creation of any number of class properties. Another advantage is that it results in a class definition that is consistent with the predefined classes, simplifying the implementation of all classes and presenting a transparent interface to the user.

It is recognized that the above systems, and methods operate using computer hardware and software in any of a variety of configurations. Such configurations can include computing devices, which generally include a processing device, one or more computer readable media, and a communication device. Other embodiments of a computing device are possible as well. For example, a computing device can include a user interface, an operating system, and one or more software applications. Several example computing devices include a personal computer (PC), a laptop computer, or a personal digital assistant (PDA). A computing device can also include one or more servers, one or more mass storage databases, and/or other resources.

A processing device is a device that processes a set of instructions. Several examples of a processing device include a microprocessor, a central processing unit, a microcontroller, a field programmable gate array, and others. Further, processing devices may be of any general variety such as reduced instruction set computing devices, complex instruction set computing devices, or specially designed processing devices such as an application-specific integrated circuit device.

Computer readable media includes volatile memory and non-volatile memory and can be implemented in any method or technology for the storage of information such as computer readable instructions, data structures, program modules, or other data. In certain embodiments, computer readable media is integrated as part of the processing device. In other embodiments, computer readable media is separate from or in addition to that of the processing device. Further, in general, computer readable media can be removable or non-removable. Several examples of computer readable media include, RAM, ROM, EEPROM and other flash memory technologies, CD-ROM, digital versatile disks (DVD) or other optical storage, magnetic cassettes, magnetic tape, magnetic disk storage or other magnetic storage devices, or any other medium that can be used to store desired information and that can be accessed by a computing device. In other embodiments, computer readable media can be configured as a mass storage database that can be used to store a structured collection of data accessible by a computing device.

A communications device establishes a data connection that allows a computing device to communicate with one or more other computing devices via any number of standard or specialized communication interfaces such as, for example, a universal serial bus (USB), 802.11a/b/g network, radio frequency, infrared, serial, or any other data connection. In general, the communication between one or more computing devices configured with one or more communication devices is accomplished via a network such as any of a number of wireless or hardwired WAN, LAN, SAN, Internet, or other packet-based or port-based communication networks.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A computer-readable storage medium containing non-transient encoded data corresponding to instructions that when executed within a programmable computer implements a method to create a user-defined .NET class within an operational control environment of distributed computing systems, the method comprising:
receiving a user-defined class;
receiving user-defined properties for the user-defined class; and
creating a .NET class based on the user-defined class and properties;
wherein each user property has several meta-properties including name, type, description, category, dynamic, timeout period.

2. A computer-readable storage medium according to claim 1, wherein receiving user-defined properties includes receiving newly created properties.

3. A computer-readable storage medium according to claim 1, wherein receiving user-defined properties includes receiving at least one of the following properties: description, name, popup information, timeout period, dynamic, or type.

4. A computer-readable storage medium according to claim 1, wherein receiving a user-defined class includes receiving the user-defined class from a managed class user module that presents a user-display window.

5. A computer-readable storage medium according to claim 1, wherein receiving user-defined properties includes receiving user-defined properties from a managed class user module that presents a user-display window.

6. A method computer-readable storage medium according to claim 1 wherein creating a .NET class includes creating a .NET class that behaves the same as a predefined class.

7. A method of creating a user-defined .NET class within an operational control environment of distributed computing systems, the method comprising:
selecting to create a new class;
defining the new class;
defining properties for the new class;
submitting the new class for creation into a .NET class based on a user-defined class and properties;
wherein each user property has several meta-properties including name, type, description, category, dynamic, timeout period.

8. A method according to claim 7, wherein the selecting to create includes selecting to copy and edit an existing class.

9. A method according to claim 8, wherein selecting to copy and edit and existing class creates a new class.

10. A method according to claim 7, further comprising: modifying an existing class.

11. A method according to claim 7, further comprising: deleting an existing class.

* * * * *